United States Patent
He et al.

(10) Patent No.: US 12,530,069 B2
(45) Date of Patent: Jan. 20, 2026

(54) MANAGING POWER STATE TRIGGERING CONDITIONS OF AN INFORMATION HANDLING SYSTEM

(71) Applicant: Dell Products L.P., Round Rock, TX (US)

(72) Inventors: Qinghong He, Austin, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 18/335,244

(22) Filed: Jun. 15, 2023

(65) Prior Publication Data
US 2024/0419234 A1    Dec. 19, 2024

(51) Int. Cl.
*G06F 1/3215*     (2019.01)
*G06F 1/3296*     (2019.01)

(52) U.S. Cl.
CPC .......... *G06F 1/3215* (2013.01); *G06F 1/3296* (2013.01)

(58) Field of Classification Search
None
See application file for complete search history.

(56) References Cited

U.S. PATENT DOCUMENTS

| | | | | |
|---|---|---|---|---|
| 9,602,983 | B1* | 3/2017 | Rahman | H03M 7/4025 |
| 2003/0233591 | A1* | 12/2003 | Chiteboun | G06F 3/038 |
| | | | | 713/300 |
| 2007/0118767 | A1* | 5/2007 | Wolford | G06F 21/31 |
| | | | | 713/193 |
| 2020/0225730 | A1* | 7/2020 | Benson | G06F 1/3218 |

* cited by examiner

*Primary Examiner* — Idriss N Alrobaye
(74) *Attorney, Agent, or Firm* — McDermott Will & Schulte LLP

(57) ABSTRACT

Managing power state triggering conditions of an information handling system, including detecting a particular keypress input of an input device of the information handling system; in response to detecting the particular keypress input: determining that the particular keypress input indicates a change in status of the power state triggering conditions of the information handling system; identifying a current status of the power state triggering conditions of the information handling system; adjusting an indicator that indicates the status of the power state triggering conditions of the information handling system from a first status to a second status; adjusting the status of the power state triggering conditions of the information handling system from the first status to the second status; and operating the information handling system based on the second status of the power state triggering conditions.

20 Claims, 4 Drawing Sheets

MANAGING POWER STATE TRIGGERING CONDITIONS OF AN INFORMATION HANDLING SYSTEM

BACKGROUND

Field of the Disclosure

The disclosure relates generally to an information handling system, and in particular, managing power state triggering conditions of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing power state triggering conditions of an information handling system, including detecting a particular keypress input of an input device of the information handling system; in response to detecting the particular keypress input: determining that the particular keypress input indicates a change in status of the power state triggering conditions of the information handling system; identifying a current status of the power state triggering conditions of the information handling system; adjusting an indicator that indicates the status of the power state triggering conditions of the information handling system from a first status to a second status; adjusting the status of the power state triggering conditions of the information handling system from the first status to the second status; and operating the information handling system based on the second status of the power state triggering conditions.

Other embodiments of these aspects include corresponding systems, apparatus, and computer programs, configured to perform the actions of the methods, encoded on computer storage devices.

These and other embodiments may each optionally include one or more of the following features. For instance, detecting the particular keypress input of the input device includes detecting a particular combination of keypresses of a keyboard input device of the information handling system. Detecting the particular keypress input of the input device includes detecting a particular pattern of keypresses of a keyboard input device of the information handling system. Detecting the particular keypress input of the input device includes detecting a particular combination and a particular pattern of keypresses of a keyboard input device of the information handling system. In response to detecting the particular keypress input, determining that the particular keypress input indicates that the change of status of the power state triggering conditions is temporary until a power cycle of the information handling system. Detecting the power cycle of the information handling system, and in response: adjusting the indicator that indicates the status of the power-state triggering conditions of the information handling system from the second status to the first status; adjusting the status of the power-state triggering conditions of the information handling system from the second status to the first status; and operating the information handling system based on the first status of the power-state triggering conditions. In response to detecting the particular keypress input, determining that the particular keypress input indicates that the change of status of the power state triggering conditions is temporary until an additional keypress input is detected that indicates a change in status of the power state triggering conditions of the information handling system. Detecting the additional keypress input of the input device of the information handling system; in response to detecting the additional keypress input: determining that the additional keypress input indicates a change in status of the power state triggering conditions of the information handling system; identifying the current status of the power state triggering conditions of the information handling system; adjusting the indicator that indicates the status of the power state triggering conditions of the information handling system from the second status to the first status; adjusting the status of the power state triggering conditions of the information handling system from the second status to the first status; and operating the information handling system based on the first status of the power state triggering conditions. The first status indicates disabling the power state triggering conditions and the second status indicates enabling the power state triggering conditions, wherein operating the information handling system based on the second status of the power state triggering conditions includes: detecting a trigger condition associated with the power state triggering conditions; and in response to detecting the trigger condition, enabling operation of the power state triggering conditions. The first status indicates enabling the power state triggering conditions and the second status indicates disabling the power state triggering conditions, wherein operating the information handling system based on the second status of the power state triggering conditions includes: detecting a trigger condition associated with the power state triggering conditions; and in response to detecting the trigger condition, disabling operation of the power state triggering conditions. Presenting a visual indicator on a display device of the information handling system in response to adjusting the status of the power state triggering conditions of the information handling system from the first status to the second status.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
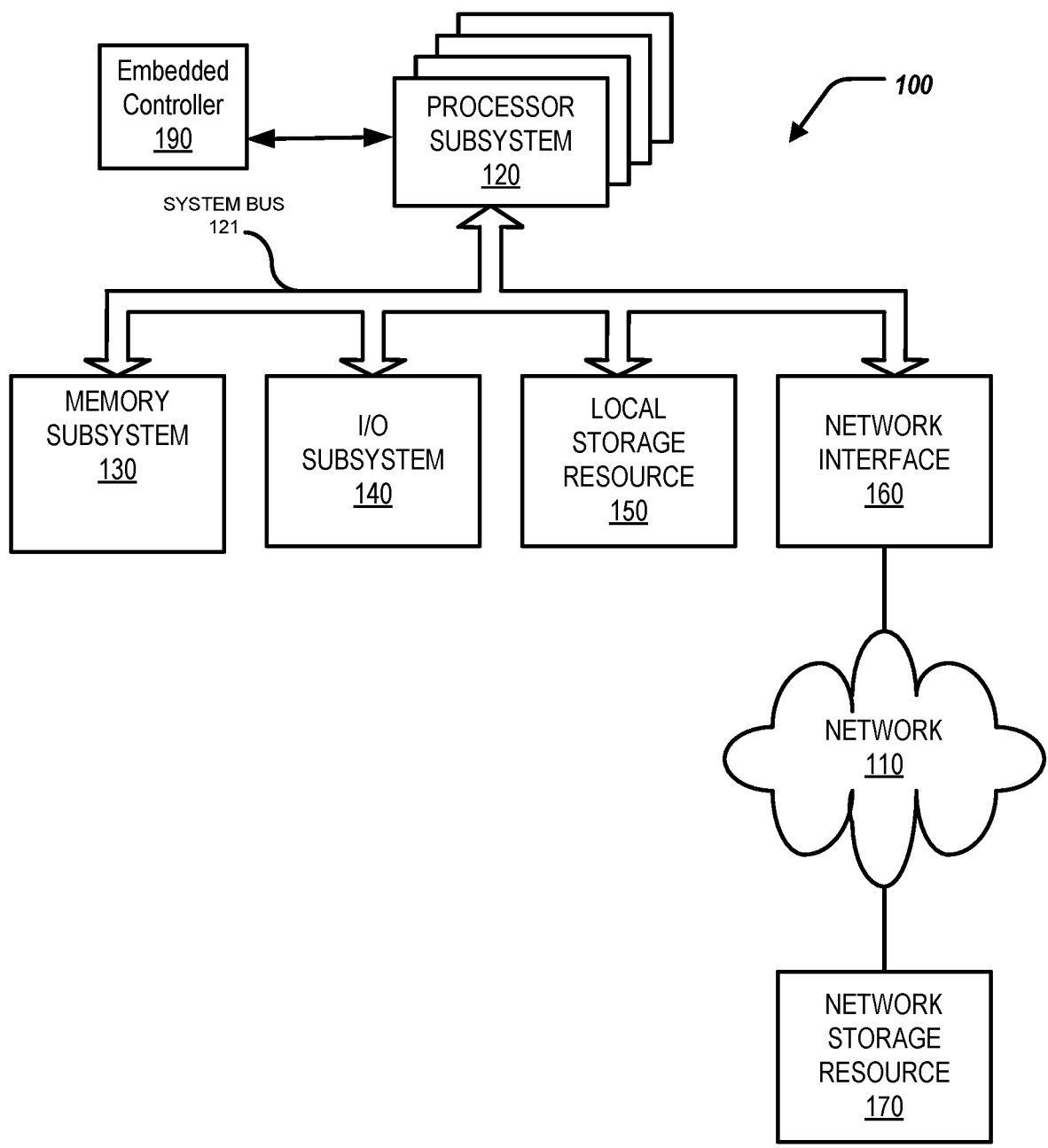
FIG. 1 is a block diagram of selected elements of an embodiment of an information handling system.

This disclosure discusses methods and systems for managing power state triggering conditions of an information handling system. In short, a particular combination and/or a particular sequence of keypress input provided by a user interacting with a keyboard input device of the information handling system can toggle a state of power state triggering conditions of the information handling system.

Specifically, this disclosure discusses a system and a method of managing power state triggering conditions of an information handling system, including detecting a particular keypress input of an input device of the information handling system; in response to detecting the particular keypress input: determining that the particular keypress input indicates a change in status of the power state triggering conditions of the information handling system; identifying a current status of the power state triggering conditions of the information handling system; adjusting an indicator that indicates the status of the power state triggering conditions of the information handling system from a first status to a second status; adjusting the status of the power state triggering conditions of the information handling system from the first status to the second status; and operating the information handling system based on the second status of the power state triggering conditions.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
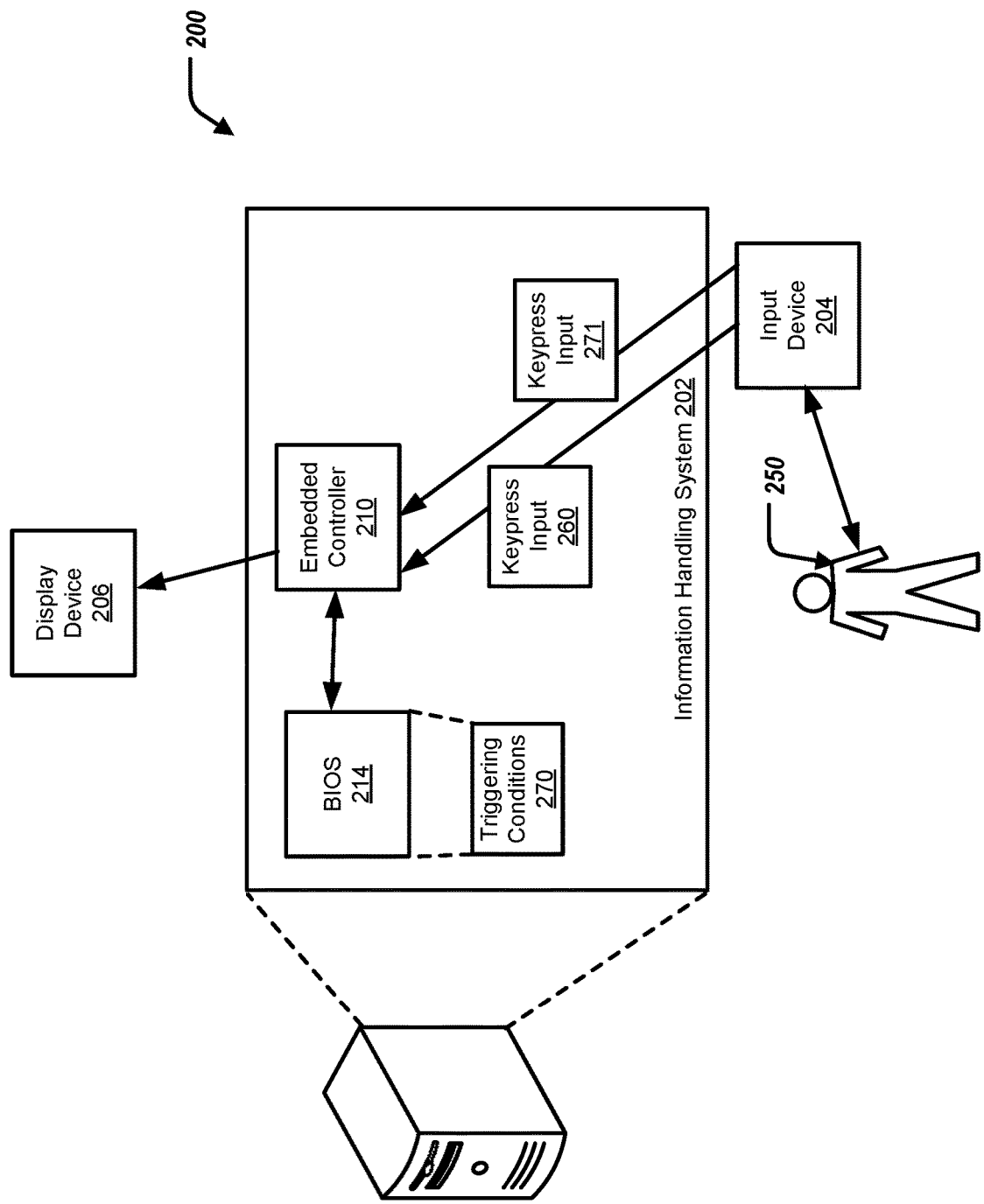
FIG. 2 illustrates a block diagram of an information handling system for managing power state triggering conditions of the information handling system.
Figure 3A:
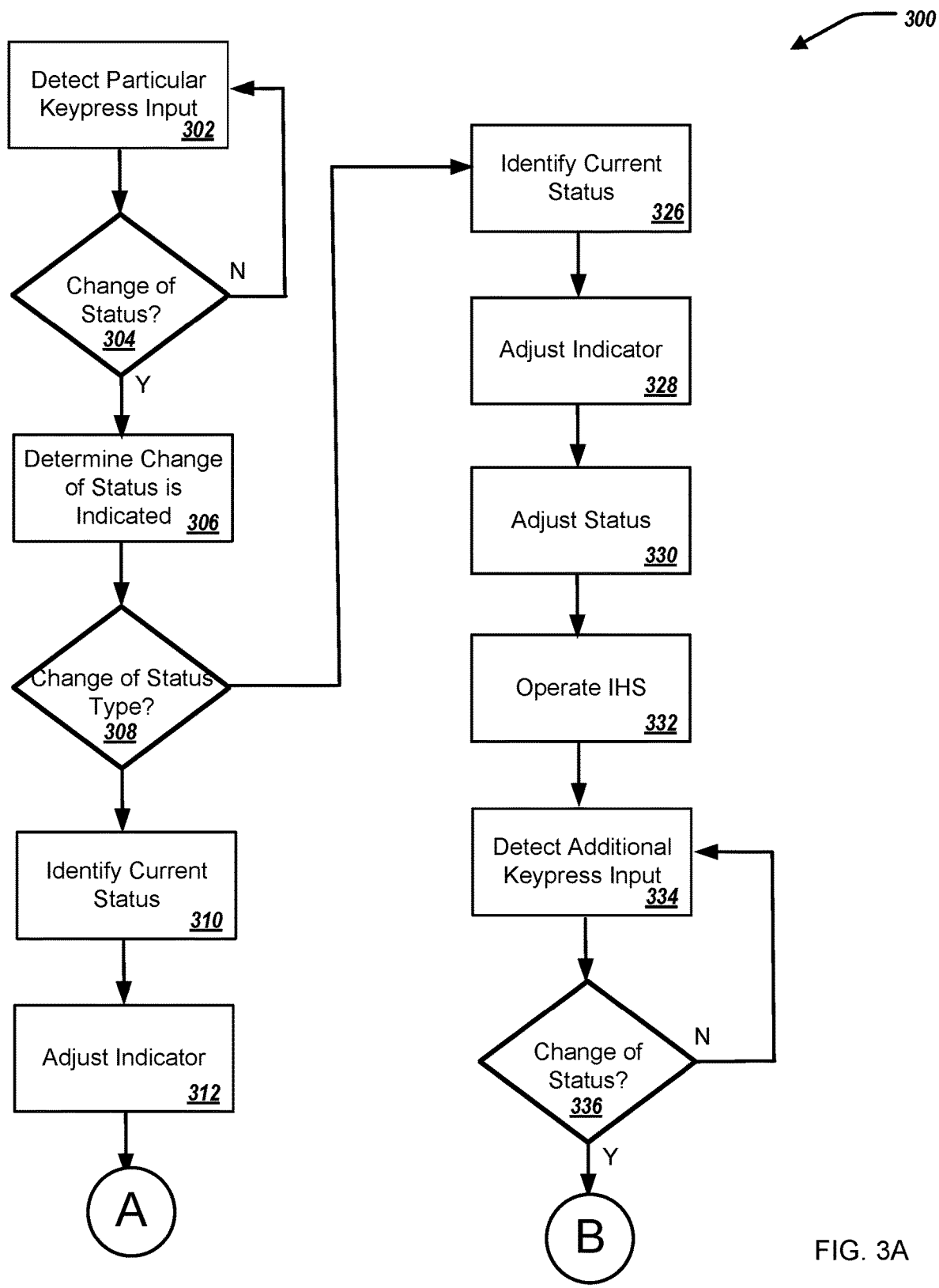
FIGS. 3A, 3B illustrates a method for managing power state triggering conditions of an information handling system.
Figure 3B:
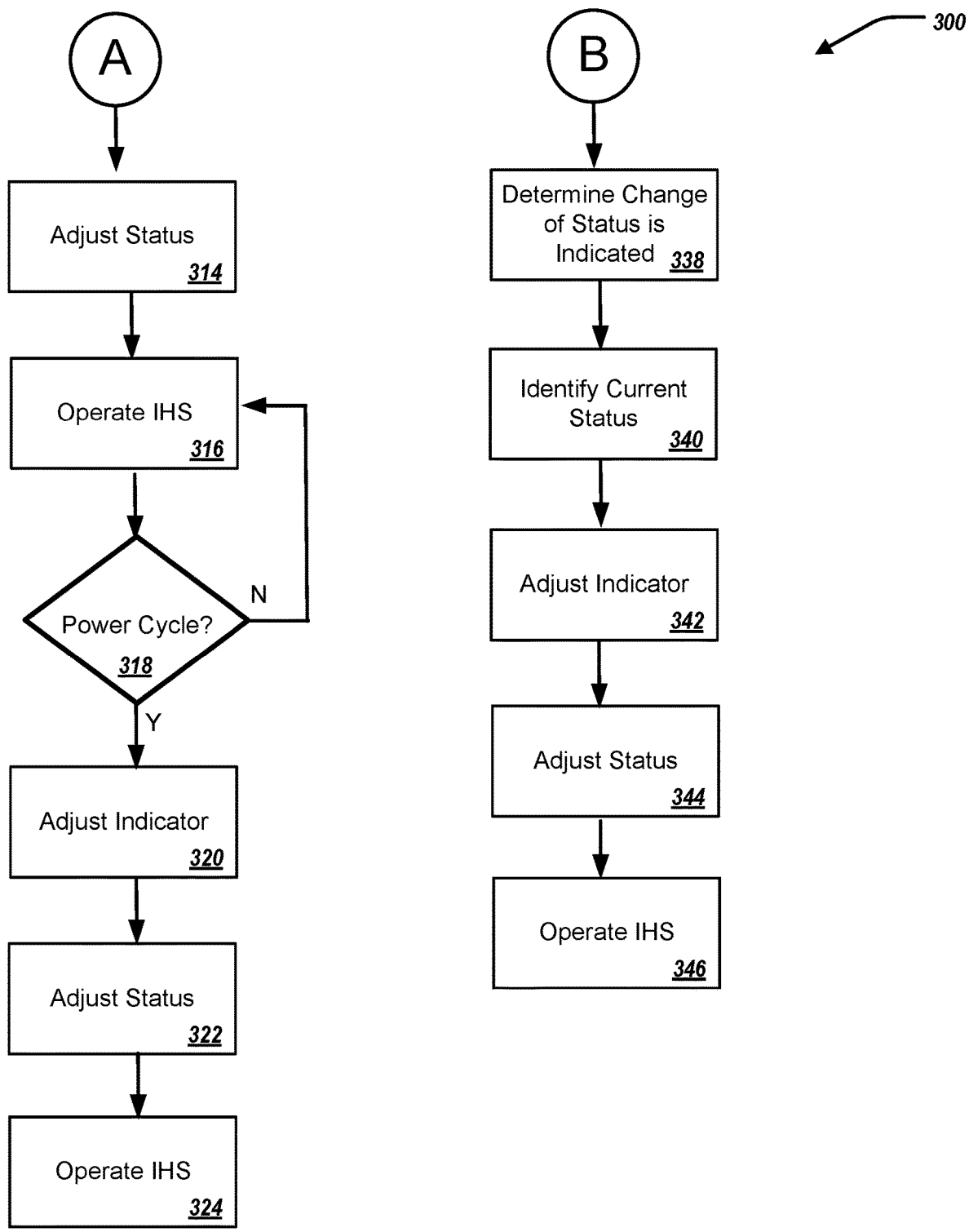

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory. EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include an embedded controller (EC) 190. The EC 190 can be in communication with the processor subsystem 120, or included by the processor subsystem 120.

In short, a particular combination and/or a particular sequence of keypress input provided by a user interacting with a keyboard input device of the information handling system 100 can toggle power state triggering conditions of the information handling system 100.

Turning to FIG. 2, FIG. 2 illustrates an environment 200 including an information handling system 202, an input device 204, and a display device 206. The information handling system 202 can include an embedded controller (EC) 210 and a basic input/output system (BIOS) 214. In some examples, the information handling system 202 is similar to, or includes, the information handling system 100 of FIG. 1. In some examples, the EC 210 is the same, or substantially the same, as the EC 190 of FIG. 1.

The information handling system 202 can be in communication with the input device 204 and the display device 206.

The EC 210 can be in communication with the input device 204 and the BIOS 214.

In some examples, the input device 204 is a keyboard input device.

In some examples, the display device 206 is a monitor coupled to the information handling system 202 and providing a graphical user interface (GUI) at the direction of the information handling system 202. In some examples, the display device 206 is integrated into a body of the information handling system 202.

FIG. 3 illustrates a flowchart depicting selected elements of an embodiment of a method 300 for managing power state triggering conditions of an information handling system. The method 300 may be performed by the information handling system 100, the information handling system 202 and/or the EC 210, and with reference to FIGS. 1-2. It is noted that certain operations described in method 300 may be optional or may be rearranged in different embodiments.

The EC 210 can detect a particular keypress input 260 of the input device 204, at 302. In particular, a user 250 can interact with the input device 204 and provide input to the input device 204. The input device 204 can provide the input as keypress input 260 to the information handling system 202. The EC 210 can receive the keypress input 260 (data representing the keypress input 260).

In some examples, when the input device 204 is a keyboard input device, the EC 210 can detect that the particular keypress input 260 is a particular combination of keypresses of the keyboard input device—e.g., which keys of the input device 204 are pressed. In some examples, when the input device 204 is a keyboard input device, the EC 210 can detect a particular pattern of keypresses of the keyboard input device—e.g., a sequence of which keys of the input device 204 are pressed. In some examples, when the input device 204 is a keyboard input device, the EC 210 can detect that the particular keypress input 260 is a particular combination of keypresses of the keyboard input device and a particular pattern of keypresses of the keyboard input device—e.g., which keys of the input device 204 are pressed and in which sequence the keys of the input device 204 are pressed.

The EC 210, in response to detecting the particular keypress 260, determines whether the particular keypress 260 indicates a change in status of power state triggering conditions 270 of the information handling system 202, at 304. In particular, the BIOS 214 can be associated with power state triggering conditions 270. The power state triggering conditions 270 can be associated with trigger conditions for powering-on the information handling system 202—changing a power state of the information handling system 202, e.g., from a power-off state to a power-on state and/or from a power-on state to a power-off state. For example, the power state triggering conditions 270 can be associated with triggering adjusting the state of the information handling system 202 from a power-off state (such as S4 or S5) to a power-on state (such as S0).

For example, the power state triggering conditions 270 can include such trigger settings as a status of a first body of the information handling system 202 with respect to a second body of the information handling system 202—when an angle between the bodies of the information handling system is greater than a threshold, a trigger condition is satisfied to power-on the information handling system 202. For example, the power state triggering conditions 270 can include such trigger settings as a status of a power input (AC) of the information handling system 202—when AC power is provided to the information handling system 202 (e.g., via a connection with a power supply adapter), a trigger condition is satisfied to power-on the information handling system 202. For example, the power state triggering conditions 270 can include such trigger settings as a network connection detection of the information handling system 202—when a network connection is established by the information handling system 202 (e.g., LAN or WiFi connection), a trigger condition is satisfied to power-on the information handling system 202. For example, the power state triggering conditions 270 can include such trigger settings as a time detection-when a current time is the same as a scheduled time, a trigger condition is satisfied to power-on the information handling system 202. For example, the power state triggering conditions 270 can include such trigger settings as a status of a docking connection of the information handling system 202—when a docking connection is established by the information handling system 202 (e.g., USB-C dock), a trigger condition is satisfied to power-on the information handling system 202.

In some examples, the EC 210 determines that the particular keypress 260 indicates a change in status of power state triggering conditions 270 of the information handling system 202, at 306. In some examples, the EC 210 determines that the particular combination of keypresses of the input device 204 indicates a change in status of power state triggering conditions 270 of the information handling system 202. In some examples, the EC 210 determines that the particular pattern of keypresses of the input device 204 indicates a change in status of power state triggering conditions 270 of the information handling system 202. In some examples, the EC 210 determines that the particular combination and particular pattern of keypresses of the input device 204 indicates a change in status of power state triggering conditions 270 of the information handling system 202.

For example, the particular combination of keypresses of the particular keypress 260 can include a keypress of the power button on the input device 204 and a key (or keys) such as the "Shift" key, the "Ctrl" key, the "Windows" key, and the "Ctrl" key and the "Alt" key.

The EC 210 can determine a change of status type, at 308. In some examples, the EC 210 can determine whether the particular keypress 260 indicates a change of status of the power state triggering conditions 270 is temporary until a power cycle of the information handling system 202, at 308. In some examples, the EC 210 can determine that the particular keypress 260 indicates a change of status of the power state triggering conditions 270 is temporary until a power cycle of the information handling system 202. For example, the EC 210 determines that the particular combination of keypresses of the input device 204 indicates a change of status of the power state triggering conditions 270 is temporary until a power cycle of the information handling system 202 ("non-sticky"). For example, the EC 210 determines that the particular pattern of keypresses of the input device 204 indicates a change of status of the power state triggering conditions 270 is temporary until a power cycle of the information handling system 202. For example, the EC 210 determines that the particular combination and particular pattern of keypresses of the input device 204 indicates a change of status of the power state triggering conditions 270 is temporary until a power cycle of the information handling system 202.

The EC 210, in response to determining that the particular keypress 260 indicates a change of status of the power state triggering conditions 270 is temporary until a power cycle of the information handling system 202 (at 308), identifies a current status of the power state triggering conditions 270 of the information handling system 202, at 310. The current status of the power state triggering conditions can be indicated/stored by the BIOS 214. That is, the BIOS 314 indicates the current status of the power state triggering conditions 270. The EC 210 communicates with the BIOS 214 to identify the current status of the power state triggering conditions 270. For example, the current status of the power state triggering conditions 270 of the information handling system 202 can indicate the power state triggering conditions 270 are disabled. For example, the current status of the power state triggering conditions 270 of the information handling system 202 can indicate the power state triggering conditions 270 are enabled.

The EC 210 can adjust an indicator that indicates that the status of the power state triggering conditions 270 of the information handling system 202 from a first status to a second status, at 312. For example, the power state triggering conditions 270 of the BIOS 214 can be associated with a global flag or global variable (global setting) of the information handling system 202 that indicates the status of power state triggering conditions 270. In some examples, the EC 210 can communicate with the BIOS 214 to adjust the indicator from indicating a status that the power state triggering conditions 270 are disabled to a status that the power state triggering conditions 270 are enabled. In some examples, the EC 210 can communicate with the BIOS 214 to adjust the indicator from indicating a status that the power state triggering conditions 270 are enabled to a status that the power state triggering conditions 270 are disabled.

The EC 210 can adjust the status of the power state triggering conditions 270 of the information handling system 202 from a first status to a second status, at 314. For example, the EC 210 can communicate with the BIOS 214 adjust the status of the power state triggering conditions 270 from being disabled to enabled. For example, the EC 210 can communicate with the BIOS 214 adjust the status of the power state triggering conditions 270 from being enabled to disabled.

The EC 210 can operate the information handling system 202 based on the second status of the power state triggering conditions 270, at 316. In some examples, when the second status of the power state triggering conditions 270 indicates enabling of the power state triggering conditions 270, the EC 210 can operate the information handling system 202 based the power state triggering conditions 270 being enabled. In some examples, operating the information handling system 202 based on the power state triggering conditions 270 being enabled can include detecting a trigger condition associated with the power state triggering conditions (e.g., an angle between the bodies of the information handling system 202 above a threshold; AC power being provided to the information handling system 202; network connection detection of the information handling system 202; current time detection same as a schedule time; and a docking connection detection of the information handling system 202). The information handling system 202, in response to such trigger condition and when the power state triggering conditions 270 are enabled, can enable operation of the power state triggering conditions 270.

In some examples, when the second status of the power state triggering conditions 270 indicates disabling of the power state triggering conditions 270, the EC 210 can operate the information handling system 202 based the power state triggering conditions 270 being disabled. In some examples, operating the information handling system 202 based on the power state triggering conditions 270 being disabled can include detecting a trigger condition associated with the power state triggering conditions 270 (e.g., an angle between the bodies of the information handling system 202 above a threshold; AC power being provided to the information handling system 202; network connection detection of the information handling system 202; current time detection same as a schedule time; and a docking connection detection of the information handling system 202). The information handling system 202, in response to such trigger condition and when the power state triggering conditions 270 are disabled, can disable operation of the power state triggering conditions 270.

In some examples, when the second status of the power state triggering conditions 270 indicates disabling of the power state triggering conditions, the EC 210 can operate the information handling system 202 based the power state triggering conditions 270 being disabled. In some examples, operating the information handling system 202 based on the power state triggering conditions 270 being disabled can include ceasing to detecting a trigger condition associated with the power state triggering conditions 270 (e.g., an angle between the bodies of the information handling system 202 above a threshold; AC power being provided to the information handling system 202; network connection detection of the information handling system 202; current time detection same as a schedule time; and a docking connection detection of the information handling system 202).

In some examples, the EC 210 can facilitate presenting a visual indicator on the display device 206 in response to adjusting the status of the power state triggering conditions 270 of the information handling system 202 from the first status to the second status. The visual indicator can include a notification displayed on the display device 206 (persistent or temporary). The visual indicator can include a lighting pattern of the input device 204 (e.g., light pattern of LEDs of the input device 204).

The EC 210 can detect whether a power cycle of the information handling system 202 has occurred, at 318. For example, the user 250 can provide input to facilitate the power cycle of the information handling system 202, or to indicate a desired power cycle of the information handling system 202. The power cycle of the information handling system 202 can include cycling the information handling system 202 from an on-power state (e.g., S0), to an off-power state (e.g., S4 or S5), back to an on-power state (e.g., S0). In some examples, the EC 210 detects the power cycle of the information handling system 202 has occurred, and in response, communicates with the BIOS 214 to adjust the indicator that indicates that the status of the power state triggering conditions 270 of the information handling system 202 from the second status to the first status, at 320. In some examples, the EC 210 can communicate with the BIOS 214 to adjust the indicator from indicating a status that the power state triggering conditions 270 are enabled to a status that the power state triggering conditions 270 are disabled. In some examples, the EC 210 can communicate with the BIOS 214 to adjust the indicator from indicating a status that the power state triggering conditions 270 are disabled to a status that the power state triggering conditions 270 are enabled.

The EC 210 can communicate with the BIOS 214 to adjust the status of the power state triggering conditions 270 of the information handling system 202 from the second status to the first status, at 322. For example, the EC 210 can communicate with the BIOS 214 to adjust the status of the power state triggering conditions 270 from being enabled to disabled. For example, the EC 210 can communicate with the BIOS 214 to adjust the status of the power state triggering conditions 270 from being disabled to enabled.

The EC 210 can operate the information handling system 202 based on the first status of the power state triggering conditions 270, at 324. In some examples, when the first status of the power state triggering conditions 270 indicates disabling of the power state triggering conditions, the EC 210 can operate the information handling system 202 based on the power state triggering conditions 270 being disabled. In some examples, operating the information handling system 202 based on the power state triggering conditions 270 being disabled can include detecting a trigger condition associated with the power state triggering conditions 270 (e.g., an angle between the bodies of the information handling system 202 above a threshold; AC power being provided to the information handling system 202; network connection detection of the information handling system 202; current time detection same as a schedule time; and a docking connection detection of the information handling system 202). The information handling system 202, in response to such trigger condition and when the power state triggering conditions 270 are disabled, can disable operation of the power state triggering conditions 270.

In some examples, when the first status of the power state triggering conditions 270 indicates disabling of the power state triggering conditions 270, the EC 210 can operate the information handling system 202 based on the power state triggering conditions 270 being disabled. In some examples, operating the information handling system 202 based on the power state triggering conditions 270 being disabled can include ceasing to detecting a trigger condition associated with the power state triggering conditions 270 (e.g., an angle between the bodies of the information handling system 202 above a threshold; AC power being provided to the information handling system 202; network connection detection of the information handling system 202; current time detection same as a schedule time; and a docking connection detection of the information handling system 202).

In some examples, when the first status of the power state triggering conditions 270 indicates enabling of the power state triggering conditions 270, the EC 210 can operate the information handling system 202 based on the power state triggering conditions 270 being enabled. In some examples, operating the information handling system 202 based on the power state triggering conditions 270 being enabled can include detecting a trigger condition associated with the power state triggering conditions 270 (e.g., an angle between the bodies of the information handling system 202 above a threshold; AC power being provided to the information handling system 202; network connection detection of the information handling system 202; current time detection same as a schedule time; and a docking connection detection of the information handling system 202). The information handling system 202, in response to such trigger condition and when the power state triggering conditions 270 are enabled, can enable operation of the power state triggering conditions 270.

In some examples, the EC 210 can facilitate presenting a visual indicator on the display device 206 in response to the status of the power state triggering conditions 270 of the information handling system 202 being adjusted from the second status to the first status. The visual indicator can include a notification displayed on the display device 206 (persistent or temporary). The visual indicator can include a lighting pattern of the input device 204 (e.g., light pattern of LEDs of the input device 204).

In some examples, the EC 210 determines that the particular keypress 260 does not indicate a change in status of power state triggering conditions 270 of the information handling system 202, at 304. The method returns to step 302.

In some examples, the EC 210 detects that a power cycle of the information handling system 202 has not occurred (at 318), and returns to step 316.

At 308, as mentioned previously, the EC 210 can determine a change of status type. In some examples, the EC 210 can determine whether the particular keypress 260 indicates a change of status of the power state triggering conditions 270 is temporary until an additional keypress input 271 is detected that indicates a change in the status of the power state triggering conditions 270 of the information handling system 202. In some examples, the EC 210 can determine that the particular keypress 260 indicates a change of status of the power state triggering conditions 270 is temporary until an additional keypress input 271 is detected that indicates a change in the status of the power state triggering conditions 270 of the information handling system 202 ("sticky"). For example, the EC 210 determines that the particular combination of keypresses of the input device 204 indicates a change of status of the power state triggering conditions 270 is temporary until an additional keypress input 271 is detected that indicates a change in the status of the power state triggering conditions 270 of the information handling system 202. For example, the EC 210 determines that the particular pattern of keypresses of the input device 204 indicates a change of status of the power state triggering conditions 270 is temporary until an additional keypress input 271 is detected that indicates a change in the status of the power state triggering conditions 270 of the information handling system 202. For example, the EC 210 determines that the particular combination and particular pattern of keypresses of the input device 204 indicates a change of status of the power state triggering conditions 270 is temporary until an additional keypress input 271 is detected that indicates a change in the status of the power state triggering conditions 270 of the information handling system 202.

The EC 210, in response to determining that the particular keypress 260 indicates a change of status of the power state triggering conditions 270 is temporary until an additional keypress input 271 is detected (at 308), identifies a current status of the power state triggering conditions 270 of the information handling system 202, at 326. The EC 210 communicates with the BIOS 214 to identify the current status of the power state triggering conditions 270. For example, the current status of the power state triggering conditions 270 of the information handling system 202 can indicate the power state triggering conditions 270 are disabled. For example, the current status of the power state triggering conditions 270 of the information handling system 202 can indicate the power state triggering conditions 270 are enabled.

The EC 210 can adjust an indicator that indicates that the status of the power state triggering conditions 270 of the information handling system 202 from a first status to a second status, at 328. For example, the power state triggering conditions 270 of the BIOS 214 can be associated with a global flag or global variable (global setting) of the information handling system 202 that indicates the status of the power state triggering conditions 270. In some examples, the EC 210 can communicate with the BIOS 214 to adjust the indicator from indicating a status that the power state triggering conditions 270 are disabled to a status that the power state triggering conditions 270 are enabled. In some examples, the EC 210 can communicate with the BIOS 214 to adjust the indicator from indicating a status that the power state triggering conditions 270 are enabled to a status that the power state triggering conditions 270 are disabled.

The EC 210 can communicate with the BIOS 214 to adjust the status of the power state triggering conditions 270 of the information handling system 202 from a first status to a second status, at 330. For example, the EC 210 can communicate with the BIOS 214 to adjust the status of the power state triggering conditions 270 from being disabled to enabled. For example, the EC 210 can communicate with the BIOS 214 to adjust the status of the power state triggering conditions 270 from being enabled to disabled.

The EC 210 can operate the information handling system 202 based on the second status of the power state triggering conditions 270, at 332. In some examples, when the second status of the power state triggering conditions 270 indicates enabling of the power state triggering conditions 270, the EC 210 can operate the information handling system 202 based on the power state triggering conditions 270 being enabled. In some examples, operating the information handling system 202 based on the power state triggering conditions 270 being enabled can include detecting a trigger condition associated with the power state triggering conditions 270 (e.g., an angle between the bodies of the information handling system 202 above a threshold; AC power being provided to the information handling system 202; network connection detection of the information handling system 202; current time detection same as a schedule time; and a docking connection detection of the information handling system 202). The information handling system 202, in response to such trigger condition and when the power state triggering conditions 270 are enabled, can enable operation of the power state triggering conditions 270.

In some examples, when the second status of the power state triggering conditions 270 indicates disabling of the power state triggering conditions 270, the EC 210 can operate the information handling system 202 based on the power state triggering conditions 270 being disabled. In some examples, operating the information handling system 202 based on the power state triggering conditions 270 being disabled can include detecting a trigger condition associated with the power state triggering conditions 270 (e.g., an angle between the bodies of the information handling system 202 above a threshold; AC power being provided to the information handling system 202; network connection detection of the information handling system 202; current time detection same as a schedule time; and a docking connection detection of the information handling system 202). The information handling system 202, in response to such trigger condition and when the power state triggering conditions 270 are disabled, can disable operation of the power state triggering conditions 270.

In some examples, when the second status of the power state triggering conditions 270 indicates disabling of the power state triggering conditions, the EC 210 can operate the information handling system 202 based on the power state triggering conditions 270 being disabled. In some examples, operating the information handling system 202 based on the power state triggering conditions 270 being disabled can include ceasing to detecting a trigger condition associated with the power state triggering conditions 270 (e.g., an angle between the bodies of the information handling system 202 above a threshold; AC power being provided to the information handling system 202; network connection detection of the information handling system 202; current time detection same as a schedule time; and a docking connection detection of the information handling system 202).

In some examples, the EC 210 can facilitate presenting a visual indicator on the display device 206 in response to the status of the power state triggering conditions 270 of the information handling system 202 being adjusted from the first status to the second status. The visual indicator can include a notification displayed on the display device 206 (persistent or temporary). The visual indicator can include a lighting pattern of the input device 204 (e.g., light pattern of LEDs of the input device 204).

The EC 210 can detect an additional keypress input 271 of the input device 204, at 334. In particular, the user 250 can interact with the input device 204 and provide additional input to the input device 204. The input device 204 can provide the input as additional keypress input 271 to the information handling system 202. The EC 210 can receive the additional keypress input 271 (data representing the additional keypress input 271).

In some examples, when the input device 204 is a keyboard input device, the EC 210 can detect that the additional keypress input 271 is a particular combination of keypresses of the keyboard input device—e.g., which keys of the input device 204 are pressed. In some examples, when the input device 204 is a keyboard input device, the EC210 can detect a particular pattern of keypresses of the keyboard input device—e.g., a sequence of which keys of the input device 204 are pressed. In some examples, when the input device 204 is a keyboard input device, the EC 210 can detect that the additional keypress input 271 is a particular combination of keypresses of the keyboard input device and a particular pattern of keypresses of the keyboard input device—e.g., which keys of the input device 204 are pressed and in which sequence the keys of the input device 204 are pressed.

The EC 210, in response to detecting the additional keypress input 271, determines whether the additional keypress input 271 indicates a change in status of power state triggering conditions 270 of the information handling system 202, at 336.

In some examples, the EC 210 determines that the additional keypress input 271 indicates a change in status of power state triggering conditions 270 of the information handling system 202, at 338. In some examples, the EC 210 determines that the particular combination of keypresses of the input device 204 indicates a change in status of power state triggering conditions 270 of the information handling system 202. In some examples, the EC 210 determines that the particular pattern of keypresses of the input device 204 indicates a change in status of power state triggering conditions 270 of the information handling system 202. In some examples, the EC 210 determines that the particular combination and particular pattern of keypresses of the input device 204 indicates a change in status of power state triggering conditions 270 of the information handling system 202.

For example, the particular combination of keypresses of the additional keypress 271 can include a keypress of the power button on the input device 204 and a key (or keys) such as the "Shift" key, the "Ctrl" key, the "Windows" key, and the "Ctrl" key and the "Alt" key.

The EC 210 identifies a current status of the power state triggering conditions of the information handling system 202, at 340. The EC 210 communicates with the BIOS 214 to identify the current status of the power state triggering conditions 270. For example, the current status of the power state triggering conditions 270 of the information handling system 202 can indicate the power state triggering conditions 270 are disabled. For example, the current status of the power state triggering conditions 270 of the information handling system 202 can indicate the power state triggering conditions 270 are enabled.

The EC 210 can adjust an indicator that indicates that the status of the power state triggering conditions 270 of the information handling system 202 from the second status to the first status, at 342. For example, the power state triggering conditions 270 of the BIOS 214 can be associated with a global flag or global variable (global setting) of the information handling system 202 that indicates the status of the power state triggering conditions 270. In some examples, the EC 210 can communicate with the BIOS 214 to adjust the indicator from indicating a status that the power state triggering conditions 270 are disabled to a status that the power state triggering conditions 270 are enabled. In some examples, the EC 210 can communicate with the BIOS 214 to adjust the indicator from indicating a status that the power state triggering conditions 270 are enabled to a status that the power state triggering conditions 270 are disabled.

The EC 210 can adjust the status of the power state triggering conditions 270 of the information handling system 202 from the second status to the first status, at 344. For example, the EC 210 can communicate with the BIOS 214 to adjust the status of the power state triggering conditions 270 from being disabled to enabled. For example, the EC 210 can communicate with the BIOS 214 to adjust the status of the power state triggering conditions 270 from being enabled to disabled.

The EC 210 can operate the information handling system 202 based on the first status of the power state triggering conditions 270, at 346. In some examples, when the first status of the power state triggering conditions 270 indicates enabling of the power state triggering conditions 270, the EC 210 can operate the information handling system 202 based the power state triggering conditions 270 being enabled. In some examples, operating the information handling system 202 based on the power state triggering conditions 270 being enabled can include detecting a trigger condition associated with the power state triggering conditions 270 (e.g., an angle between the bodies of the information handling system 202 above a threshold; AC power being provided to the information handling system 202; network connection detection of the information handling system 202; time detection same as a schedule time; and a docking connection detection of the information handling system 202). The information handling system 202, in response to such trigger condition and when the power state triggering conditions 270 are enabled, can enable operation of the power state triggering conditions 270.

In some examples, when the first status of the power state triggering conditions 270 indicates disabling of the power state triggering conditions, the EC 210 can operate the information handling system 202 based on the power state triggering conditions 270 being disabled. In some examples, operating the information handling system 202 based on the power state triggering conditions 270 being disabled can include detecting a trigger condition associated with the power state triggering conditions 270 (e.g., an angle between the bodies of the information handling system 202 above a threshold; AC power being provided to the information handling system 202; network connection detection of the information handling system 202; time detection same as a schedule time; and a docking connection detection of the information handling system 202). The information handling system 202, in response to such trigger condition and when the power state triggering conditions 270 are disabled, can disable operation of the power state triggering conditions 270.

In some examples, when the first status of the power state triggering conditions 270 indicates disabling of the power state triggering conditions, the EC 210 can operate the information handling system 202 based on the power state triggering conditions 270 being disabled. In some examples, operating the information handling system 202 based on the power state triggering conditions 270 being disabled can include ceasing to detecting a trigger condition associated with the power state triggering conditions 270 (e.g., an angle between the bodies of the information handling system 202 above a threshold; AC power being provided to the information handling system 202; network connection detection of the information handling system 202; time detection same as a schedule time; and a docking connection detection of the information handling system 202).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing power state triggering conditions of an information handling system, comprising:
    detecting a particular keypress input of an input device of the information handling system;
    in response to detecting the particular keypress input:
        determining that the particular keypress input indicates a change in status of the power state triggering conditions of the information handling system, the power state triggering conditions being conditions that trigger, when a time condition is satisfied, a powering-on of the information handling system;
        identifying a current status of the power state triggering conditions of the information handling system;
        adjusting an indicator that indicates the status of the power state triggering conditions of the information handling system from a first status to a second status;
        adjusting the status of the power state triggering conditions of the information handling system from the first status to the second status; and
        operating the information handling system based on the second status of the power state triggering conditions.

2. The computer-implemented method of claim 1, wherein detecting the particular keypress input of the input device includes detecting a particular combination of keypresses of a keyboard input device of the information handling system.

3. The computer-implemented method of claim 1, wherein detecting the particular keypress input of the input device includes detecting a particular pattern of keypresses of a keyboard input device of the information handling system.

4. The computer-implemented method of claim 1, wherein detecting the particular keypress input of the input device includes detecting a particular combination and a particular pattern of keypresses of a keyboard input device of the information handling system.

5. The computer-implemented method of claim 1, further including in response to detecting the particular keypress input, determining that the particular keypress input indicates that the change of status of the power state triggering conditions is temporary until a power cycle of the information handling system.

6. The computer-implemented method of claim 5, further including:
   detecting the power cycle of the information handling system, and in response:
      adjusting the indicator that indicates the status of the power-state triggering conditions of the information handling system from the second status to the first status;
      adjusting the status of the power-state triggering conditions of the information handling system from the second status to the first status; and
      operating the information handling system based on the first status of the power-state triggering conditions.

7. The computer-implemented method of claim 1, further including in response to detecting the particular keypress input, determining that the particular keypress input indicates that the change of status of the power state triggering conditions is temporary until an additional keypress input is detected that indicates a change in status of the power state triggering conditions of the information handling system.

8. The computer-implemented method of claim 7, further including:
   detecting the additional keypress input of the input device of the information handling system;
   in response to detecting the additional keypress input:
      determining that the additional keypress input indicates a change in status of the power state triggering conditions of the information handling system;
      identifying the current status of the power state triggering conditions of the information handling system;
      adjusting the indicator that indicates the status of the power state triggering conditions of the information handling system from the second status to the first status;
      adjusting the status of the power state triggering conditions of the information handling system from the second status to the first status; and
      operating the information handling system based on the first status of the power state triggering conditions.

9. The computer-implemented method of claim 1, wherein the first status indicates disabling the power state triggering conditions and the second status indicates enabling the power state triggering conditions, wherein operating the information handling system based on the second status of the power state triggering conditions includes:
   detecting a trigger condition associated with the power state triggering conditions; and
   in response to detecting the trigger condition, enabling operation of the power state triggering conditions.

10. The computer-implemented method of claim 1, wherein the first status indicates enabling the power state triggering conditions and the second status indicates disabling the power state triggering conditions, wherein operating the information handling system based on the second status of the power state triggering conditions includes:
   detecting a trigger condition associated with the power state triggering conditions; and
   in response to detecting the trigger condition, disabling operation of the power state triggering conditions.

11. The computer-implemented method of claim 1, further including presenting a visual indicator on a display device of the information handling system in response to adjusting the status of the power state triggering conditions of the information handling system from the first status to the second status.

12. An information handling system comprising a processor having access to memory media storing instructions executable by the processor to perform operations, comprising
   detecting a particular keypress input of an input device of the information handling system;
   in response to detecting the particular keypress input:
      determining that the particular keypress input indicates a change in status of power state triggering conditions of the information handling system, the power state triggering conditions being conditions that trigger, when a time condition is satisfied, a powering-on of the information handling system;
      identifying a current status of the power state triggering conditions of the information handling system;
      adjusting an indicator that indicates the status of the power state triggering conditions of the information handling system from a first status to a second status;
      adjusting the status of the power state triggering conditions of the information handling system from the first status to the second status; and
      operating the information handling system based on the second status of the power state triggering conditions.

13. The information handling system of claim 12, wherein detecting the particular keypress input of the input device includes detecting a particular combination of keypresses of a keyboard input device of the information handling system.

14. The information handling system of claim 12, wherein detecting the particular keypress input of the input device includes detecting a particular pattern of keypresses of a keyboard input device of the information handling system.

15. The information handling system of claim 12, wherein detecting the particular keypress input of the input device includes detecting a particular combination and a particular pattern of keypresses of a keyboard input device of the information handling system.

16. The information handling system of claim 12, further including in response to detecting the particular keypress input, determining that the particular keypress input indicates that the change of status of the power state triggering conditions is temporary until a power cycle of the information handling system.

17. The information handling system of claim 16, the operations further including:
   detecting the power cycle of the information handling system, and in response:
      adjusting the indicator that indicates the status of the power state triggering conditions of the information handling system from the second status to the first status;
      adjusting the status of the power state triggering conditions of the information handling system from the second status to the first status; and
      operating the information handling system based on the first status of the power state triggering conditions.

18. The information handling system of claim 12, the operations further including in response to detecting the particular keypress input, determining that the particular keypress input indicates that the change of status of the power state triggering conditions is temporary until an additional keypress input is detected that indicates a change in status of the power state triggering conditions of the information handling system.

19. The information handling system of claim 18, the operations further including:
   detecting the additional keypress input of the input device of the information handling system;
   in response to detecting the additional keypress input:
      determining that the additional keypress input indicates a change in status of the power state triggering conditions of the information handling system;
      identifying the current status of the power state triggering conditions of the information handling system;
      adjusting the indicator that indicates the status of the power state triggering conditions of the information handling system from the second status to the first status;
      adjusting the status of the power state triggering conditions of the information handling system from the second status to the first status; and
      operating the information handling system based on the first status of the power state triggering conditions.

20. A non-transitory computer-readable medium storing software comprising instructions executable by one or more computers which, upon such execution, cause the one or more computers to perform operations comprising:
   detecting a particular keypress input of an input device of the information handling system;
   in response to detecting the particular keypress input:
      determining that the particular keypress input indicates a change in status of power state triggering conditions of the information handling system, the power state triggering conditions being conditions that trigger, when a time condition is satisfied, a powering-on of the information handling system;
      identifying a current status of the power state triggering conditions of the information handling system;
      adjusting an indicator that indicates the status of the power state triggering conditions of the information handling system from a first status to a second status;
      adjusting the status of the power state triggering conditions of the information handling system from the first status to the second status; and
      operating the information handling system based on the second status of the power state triggering conditions.

* * * * *